UNITED STATES PATENT OFFICE.

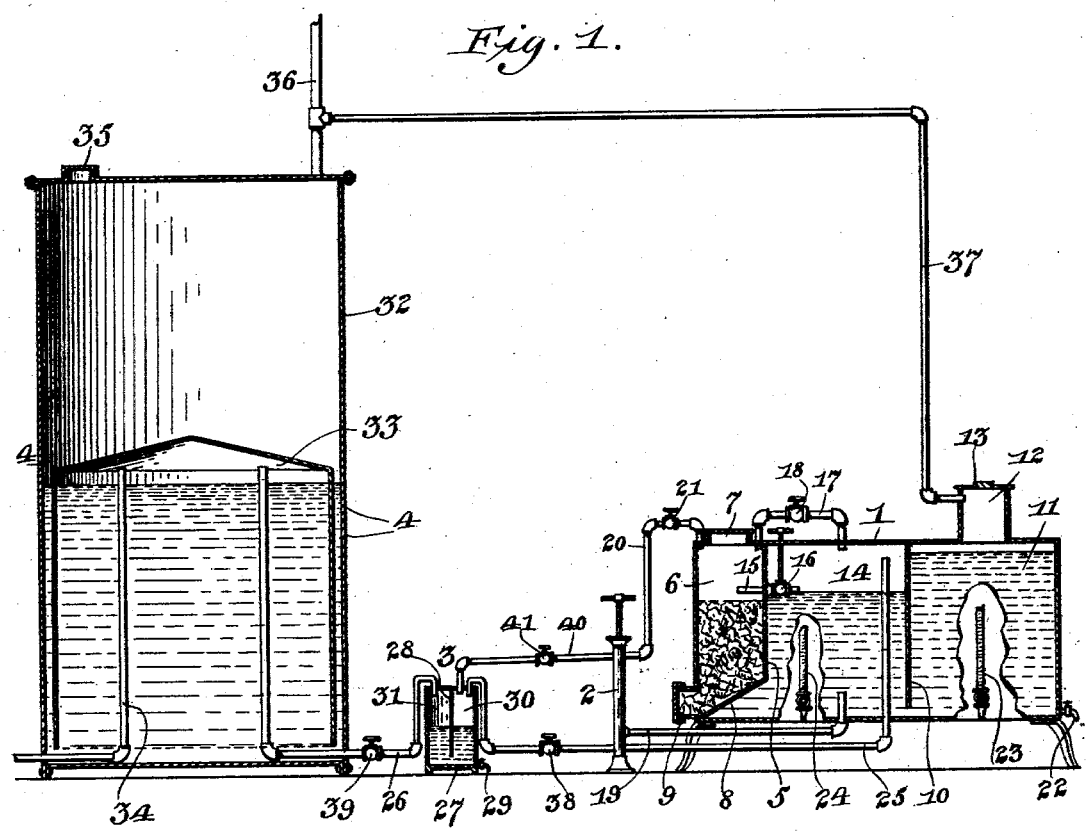

RUFUS ARTHUR WHEELOCK, CHARLES F. WALKER, AND HENRY C. DIERS, OF TACOMA, WASHINGTON.

ACETYLENE-GAS GENERATOR.

SPECIFICATION forming part of Letters Patent No. 629,282, dated July 18, 1899.

Application filed September 12, 1898. Serial No. 690,768. (No model.)

*To all whom it may concern:*

Be it known that we, RUFUS ARTHUR WHEELOCK, CHARLES F. WALKER, and HENRY C. DIERS, citizens of the United States, residing at Tacoma, in the county of Pierce and State of Washington, have invented certain new and useful Improvements in Acetylene-Gas Generators; and we do hereby declare the following to be a full, clear, and exact description of the invention, such as will enable others skilled in the art to which it appertains to make and use the same.

Our invention relates to improvements in acetylene-gas generators; and its object is to provide a generator which can be charged without the escape of the gas or odor and which can be cleaned out at any time without the escape of odor.

It consists in a suitable casing having a water-tank and a carbid-receptacle, means for automatically regulating the flow of the water upon the carbid, and means for leading the gas generated to a suitable point for use.

It further consists in a generator having a tank for holding water and compartments for containing a metallic carbid, means connecting the tank and carbid-chamber whereby the apparatus may be recharged with fresh carbid without the escape of odor or gas.

It also consists in certain other novel constructions, combinations, and arrangements of parts, as will be hereinafter more fully described and claimed.

In the accompanying drawings, Figure 1 represents a vertical longitudinal section through a gas-generator constructed in accordance with our invention and a gasometer for receiving and storing the gas, and Fig. 2 represents a top plan view of the same.

In the accompanying drawings the numeral 1 represents a gas-generator; 2, a pump; 3, a purifier, and 4 a gasometer.

In carrying out the purposes of our invention the generator proper comprises a tank or casing divided by means of partitions into the different receptacles. Partition 5 forms at one end of the casing 1 a carbid-chamber, as 6, said carbid-chamber being provided with an opening, as 7, adapted to be closed by any suitable cover through which the carbid may be inserted into the said chamber. The lower portion of the partition 5 is preferably inclined, as at 8, so as to direct the contents of the chamber 6 to a discharge-opening, as at 9. This discharge-opening 9 is preferably adapted to be tightly closed by a suitable cover. The remainder of the tank 1 is adapted to hold water, this portion of the tank being preferably provided with a central partition, as 10, which is secured to the top and sides of the tank 1 and extends to a point near the bottom thereof, a sufficient space being left for water to pass beneath the said partition. The portion of the tank 10 farthest from the chamber 6, as at 11, is provided with a dome 12, the said dome having a removable cover, as 13, secured thereto. Water can be supplied to the tank by removing the cover 13 or by any other desired means. The other chamber or water-tank, as 14, is connected with the carbid-chamber 6 by means of a short pipe, as 15, the said pipe being provided with a valve, as 16, preferably arranged interiorly of the chamber 14. The handle of the valve extends upwardly and through the top of the tank 1, the operating-handle being upon the outside of the said tank. The chambers 14 and 6 are also connected by a pipe, as 17, which is preferably arranged upon the top of the tank 1, the ends of the said pipe projecting into each of the said chambers. The portion of the pipe which is exterior to the tank is also provided with a valve, as 18.

The pump 2 may be made in any suitable form and is connected by means of a pipe 19 with the chamber 14 of the water-tank. The pump is also connected by means of a pipe, as 20, with the carbid-chamber 6, the said pipe 20 being provided with a valve 21. The water-tank may have a suitable discharge-cock, as at 22, by which the water may be drawn off for cleansing the tank. If desired, water-gages, as 23 and 24, may also be mounted upon the side of the two chambers 11 and 14, respectively, of the water-tank. By the use of this the height of the water in the said tank can be at all times known.

When gas is to be generated, the carbid-chamber 6 is partially filled with some metallic carbid, preferably calcium carbid, and the covers or caps of the openings 7 and 9 firmly secured in place. The stop-cocks 16, 18, and 21 are preferably closed at first. Water is then placed in the tank until it rises several inches above the end of the pipe 15, which projects into the chamber 14. In order to start the formation of the gas, the cock 16 is first opened, which permits the water to flow upon the carbid through the pipe 15. The generation of the gas of course begins at once, and by opening the valve 18 it can pass from the carbid-chamber 6 to the water-chamber 14. By this means when sufficient gas has been generated to exert pressure upon the water in the tank 14 the water will be forced to a point below the end of the pipe 15, thus automatically cutting off the supply of the said water to the carbid-chamber. If the gas be drawn off for use, the pressure upon the water being relieved it will again flow upon the carbid to continue the operation of generating the gas. It will thus be seen that the generation of the gas can be automatically regulated. From the chamber 14 the gas may be drawn by means of a pipe, as 25, which extends from the upper part of the said chamber 14 to the purifier 3, whence the gas after being purified is conducted through the pipe 26 to the gasometer 4. After all the calcium carbid has been used the chamber 6 may be discharged and recharged in the following manner: The cock 16 is first closed. The cock 21 is then opened, and by operating the pump 2 water may be drawn from the tank 14 through the pipe 19 and forced into the chamber 6 until the same is completely filled and some of the water has been forced back through the pipe 17 into the chamber 14. This operates to expel every vestige of gas and odor from the chamber 6. The pump may be then stopped and the cap of the opening 9 be opened, so as to discharge the slaked carbid and water from the said chamber 6. The cover of the opening 9 is then readjusted in place and new carbid is stored in the chamber 6 through the opening 7. By this means the generator is again in condition to be put in operation for forming the gas. This manner of cleaning and recharging the carbid-chamber forms an important feature of our invention, particularly as it enables us to accomplish the result without the escape or any disagreeable smell of gas.

While the gas may be taken directly from the generator for use, it is preferable to pass it first through the purifier. As seen in the drawings, our improved purifier consists in a tank, as 27, provided with a central partition, as 28, which is secured to the top and sides of the tank and extends to a point near the bottom thereof. This partition forms two chambers in the tank 27, which are connected at the bottom by means of the passage beneath the partition 28. The tank is also provided with a discharge-cock, as 29, by which its contents may be emptied. The gas coming from the generator through the pipe 25 enters one chamber of the purifier, as 30, whence it passes through the water beneath the partition 28 into the chamber 31. Thence it is led by means of the pipe 26 into the gasometer 4. The gasometer 4 preferably consists of an outer inclosing tank 32 and an inner gas-holding tank or cylinder 33. The cylinder 33 is open at the bottom and adapted to be sealed by means of water in the usual way. The pipe 26, entering the gasometer, conducts the gas to a point above the surface of the water, and a discharge-pipe for distributing the gas, as 34, also leads from a point above the water to any desired point outside the tank. The casing 32 is preferably tightly closed to retain any odor which the gas may produce, the said casing being provided with a closed opening, as 35, through which the water may be introduced to form the seal. A ventilator-pipe, as 36, is also connected with the tank 32, preferably entering the same at the top, but may be connected with a sewer or led to a point above the buildings for carrying off any odor or gas which may escape. The dome 12 of the generator is preferably connected with a pipe 36 by means of a pipe 37, so that any odors from the gas which may by any means get into the chamber 11 of the tank and into the dome 12 can be led away to a convenient distance.

The manner of cleaning the purifier 3 also forms an important feature of our invention and may be described as follows: A valve, as 38, in the pipe 25 is closed, as is also a valve, as 39, in the pipe 26. The pump is then operated so as to force water through a pipe 40 and a valve 41 into the chamber 30 of the purifier-tank 27. The cock 29 is at the same time opened. By pumping the purifier-tank full of water and permitting that which is already therein to run out the said tank may be thoroughly cleaned without the escape of any gas or disagreeable odor. When the purification has been accomplished, the cock 29 is closed and sufficient water for the purpose of purifying the gas is again pumped into the tank 27. The valve 41 is next closed. Then the valves 38 and 39 may be opened to again permit the flow of the gas through the said purifier.

It will be readily seen from the above description that a generator constructed in accordance with our invention, while simple in its parts, is capable of automatically controlling the production of acetylene gas, and that it possesses a great advantage in that it can be cleansed and recharged with fresh carbid without the possibility of the escape of gas or disagreeable odor. It will be seen that it is also provided with a purifier which can be cleansed and put into operating order again without permitting of the escape of any odor or gas. The generator is always within the control of the parties operating the same and can be regulated to suit the circumstances.

Having now described our invention, what we claim as new, and desire to secure by Letters Patent, is—

1. In a gas-generator, the combination with a casing, of partitions forming water-chambers, and a carbid-chamber therein, a pipe adapted to direct the water upon the carbid, a valve controlling the flow of the water through said pipe, a second pipe for directing the flow of gas from the carbid-chamber to the water-chamber, and a valve for controlling the same, a pump connected with the water-chamber and also with the carbid-chamber, a valve controlling the flow of water from the pump to the carbid-chamber, the construction being such that when it is desired to empty the slaked carbid the flow of water may be cut off and the pump set in motion to fill the carbid-chamber with water completely and thus force the gas from the same into the water-compartment, and means for emptying and refilling the said carbid-chamber, substantially as described.

2. In a gas-generator, the combination with a casing, of partitions forming a water-chamber, and a carbid-chamber piping connecting the two, a pump also connected with the said chambers, a purifier adapted to receive the gas generated in the chambers of the casing, the said purifier comprising a tank having a partition for dividing the tank into compartments, the said partition leaving a space at the bottom by which the gas passing through the water from one chamber to the other becomes cleansed, and means for leading the gas to a gasometer or other discharging means, substantially as described.

3. In a gas-generator, the combination with a casing having water, of a carbid-compartment, means for connecting the two, a purifier for receiving the gas from the casing, a pump connected with the water-compartment and with the purifier, valves controlling the gas-pipe, and the water-pipe, and a cock for discharging the contents of the purifier, the construction being such that water may be forced by means of the pump through the purifier to cleanse it and to refill it, substantially as described.

4. In a gas-generator the combination with water-compartments, and a carbid-compartment, of pipes connecting the same, a purifier connected with the gas-compartment, a gasometer adapted to receive the said gas from the purifier, the said gasometer having an outer inclosing casing for collecting any odors or escaped gas from the parts, and a discharge or ventilator pipe connected with the said casing for leading the odors to a suitable distance, and means connecting the water-compartment of the generator with the said ventilator-pipe, substantially as described.

In testimony whereof we hereunto affix our signatures in presence of two witnesses.

RUFUS ARTHUR WHEELOCK.
CHARLES F. WALKER.
HENRY C. DIERS.

Witnesses:
FRANK J. MILLER,
ALFRED J. HOLMES.